United States Patent
Mouri et al.

(10) Patent No.: US 9,623,752 B2
(45) Date of Patent: Apr. 18, 2017

(54) VEHICLE POWER SUPPLY SYSTEM

(71) Applicant: HONDA MOTOR CO., LTD, Tokyo (JP)

(72) Inventors: Takanori Mouri, Haga-gun (JP); Kazuhiko Kuyama, Haga-gun (JP); Hiroyuki Eguchi, Tokyo (JP); Makoto Ogawa, Iruma-gun (JP); Koichi Azuma, Wako (JP); Takeshi Kanegae, Haga-gun (JP); Takeshi Goto, Haga-gun (JP); Hiroi Nonaka, Haga-gun (JP); Takumi Jinbo, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 943 days.

(21) Appl. No.: 13/747,204

(22) Filed: Jan. 22, 2013

(65) Prior Publication Data
US 2013/0187449 A1    Jul. 25, 2013

(30) Foreign Application Priority Data

Jan. 24, 2012  (JP) ................ 2012-012168
Jan. 24, 2012  (JP) ................ 2012-012169

(51) Int. Cl.
*B60L 1/00* (2006.01)
*B60L 11/18* (2006.01)

(52) U.S. Cl.
CPC .......... *B60L 1/006* (2013.01); *B60L 11/1881* (2013.01); *B60L 2270/40* (2013.01); *Y02T 90/34* (2013.01)

(58) Field of Classification Search
CPC .............................. B60L 1/006; B60L 11/1881
(Continued)

(56) References Cited

U.S. PATENT DOCUMENTS 3,770,976 A    11/1973  Stroud et al.
5,858,568 A    1/1999   Hsu et al.
(Continued)

FOREIGN PATENT DOCUMENTS

CN    1684852 A         10/2005
DE    102007051362 A1    4/2009
(Continued)

OTHER PUBLICATIONS

Chinese Office Action dated Nov. 19, 2014, isuued in corresponding CN Patent Application No. 201310015514.X with English translation (13 pages).
(Continued)

*Primary Examiner* — Thienvu Tran
*Assistant Examiner* — David M Stables
(74) *Attorney, Agent, or Firm* — Westerman, Hattori, Daniels & Adrian, LLP

(57) ABSTRACT

A vehicle power supply system includes a power supply connector having a power supply port which is provided within a trunk room and electrically connected to a DC power source, and an inverter device which is provided separately from a fuel cell automobile (an electrically driven vehicle) and is disposed within the trunk room, wherein the trunk room is provided therein with an inverter installation space where the inverter device may be installed at a position which does not overlap with the power supply port when viewed from a forward and rearward direction of the vehicle, and the invert device is provided with a connection cable which is drawn from a side surface thereof and of which a front end portion has a connector portion connected to the power supply port.

8 Claims, 13 Drawing Sheets

(58) Field of Classification Search
USPC .................................................. 307/9.1, 10.1
See application file for complete search history.

(56) References Cited

U.S. PATENT DOCUMENTS

| | | | |
|---|---|---|---|
| 6,107,691 A | 8/2000 | Gore et al. | |
| 2003/0184119 A1 | 10/2003 | Doshita et al. | |
| 2008/0196957 A1* | 8/2008 | Koike | B60K 1/04 180/68.5 |
| 2011/0109158 A1* | 5/2011 | Olsen | B60L 3/0069 307/10.1 |

FOREIGN PATENT DOCUMENTS

| | | |
|---|---|---|
| JP | 8-273680 A | 10/1996 |
| JP | 2003-86157 A | 3/2003 |
| JP | 2006-240472 A | 9/2006 |
| JP | 2006-325392 A | 11/2006 |
| JP | 2008-196153 A | 8/2008 |
| JP | 2009-292190 A | 12/2009 |
| WO | 2009/056088 A1 | 5/2009 |

OTHER PUBLICATIONS

Notice of Reasons for Rejection dated Aug. 4, 2015, issued in Japanese Application No. 2012-012168, with English translation (5 pages).
Notice of Allowance dated Oct. 20, 2015, issued in Japanese Application No. 2012-012169, with English translation (6 pages).
German Search Report dated Jul. 16, 2013, issued in corresponding German Patent Application No. 102013200880.5, w/ English translation.

\* cited by examiner

VEHICLE POWER SUPPLY SYSTEM

CROSS-REFERENCE TO RELATED APPLICATION

This application claims priority based on Japanese Patent Application No. 2012-012168, filed on Jan. 24, 2012, and Japanese Patent Application No. 2012-012169, filed on Jan. 24, 2012, the contents of which are incorporated herein by reference.

BACKGROUND

Field of the Invention

The present invention relates to a vehicle power supply system which supplies electrical power from a DC (Direct Current) power source of an electrically driven vehicle to an external AC (Alternating Current) device.

Description of Related Art

In the past, a vehicle power supply system has been proposed which uses a DC power source such as a battery or a fuel cell mounted in an electrically driven vehicle such as an electric vehicle or a fuel cell automobile and supplies electric power to a home electric appliance (for example, see Japanese Unexamined Patent Application, First Publication No. 2006-325392).

A power supply system (a vehicle power supply system) disclosed in Japanese Unexamined Patent Application, First Publication No. 2006-325392 includes a vehicle having means for supplying electric power to the outside of the vehicle, a stationary fuel cell system having an inverter for DC/AC conversion, a loading device to which the electric power is supplied from the stationary fuel cell system, and a system power source which supplies the electric power to the stationary fuel cell system. This power supply system connects the vehicle and the stationary fuel cell system and supplies the electric power from the DC power source of the vehicle via the inverter of the stationary fuel cell system to the loading device, during a power failure of the system power source.

SUMMARY

However, in a technique disclosed in Japanese Unexamined Patent Application, First Publication No. 2006-325392, the inverter to convert DC power into AC power is provided within the stationary fuel cell system. For this reason, a location, which is able to supply the electric power from the storage battery of the vehicle to the outside, is restricted to the vicinity of an installation location of the stationary fuel cell system, thereby being inconvenient for a user.

Therefore, an object of the present invention is to provide a vehicle power supply system capable of supplying electric power to the outside at any location without being subject to a restriction of a power supply location.

In addition, Japanese Unexamined Patent Application, First Publication No. 2006-325392 does not disclose a specific vehicle configuration, and thus there is still a need to think about practical use. In particular, in a case where the electrically driven vehicle is provided with the functionality capable of supplying the AC power into which the DC power is converted using the external inverter, there is a need to lay out a DC power supply circuit up to a power supply port compared to a vehicle without supplying the electric power. Accordingly, there is a need to consider a protective structure for the power supply circuit.

Therefore, an object of the present invention is also to provide an electrically driven vehicle capable of protecting a DC power supply circuit to connect a DC power source mounted in a vehicle body to a separate inverter device without occupying an effective space on the vehicle.

In order to achieve the above objects by solving the problems, the present invention adopts the following aspects.

(1) In an aspect according to the present invention, a vehicle power supply system which converts electric power into AC (Alternating Current) power from a DC (Direct Current) power source mounted in an electrically driven vehicle and supplies the AC power to an external AC device of the electrically driven vehicle, the vehicle power supply system includes a trunk room which is provided in the electrically driven vehicle; a power supply connector having a power supply port which is provided within the trunk room and electrically connected to the DC power source; and an inverter device which is provided separately from the electrically driven vehicle and is disposed within the trunk room to convert the electric power into the AC power from the DC power source, wherein the trunk room is provided therein with an inverter installation space where the inverter device may be installed at a position which does not overlap with the power supply port when viewed from a forward and rearward direction of the electrically driven vehicle, and the inverter device is provided with a connection cable which is drawn from a side surface thereof and of which a front end portion has a connector portion connected to the power supply port.

(2) In the aspect according to the above (1), the power supply port may be formed rearward and downward of the electrically driven vehicle, and when the inverter device is installed in the inverter installation space within the trunk room, the connection cable may extend upward from below of a side surface on which the power supply port is disposed among side surfaces of the inverter device.

(3) In the aspect according to the above (1), the vehicle power supply system may further include a pair of rear wheel housings which covers the outsides of left and right rear wheels; a gas tank which is disposed between the pair of rear wheel housings, supported by vehicle body frames outside the lower side of a vehicle interior, and disposed at a front side of a vehicle body of the trunk room; a tank partition panel which is lifted upward toward the front side of the vehicle body from a bottom wall of the trunk room and partitions the gas tank from the vehicle interior side; and a contactor which performs connection or cut-off of the electric power between the DC power source and the power supply connector, wherein a recessed portion which is opened upward may be provided between the lifting portion of the tank partition panel and one of the pair of rear wheel housings, and the contactor may be disposed within the recessed portion.

(4) In the aspect according to the above (3), the gas tank may be attached to the vehicle body frames through a rectangular frame-shaped sub-frame which surrounds the outside of the gas tank, and the contactor may be provided at a region which overlaps in a forward and rearward direction of the vehicle body with respect to the sub-frame attached to the vehicle body frames.

(5) In the aspect according to the above (3) or (4), the power supply connector may be connected to the contactor by a flexible cable, and is disposed at a position which is spaced apart from the contactor in the trunk room to the rear side of the vehicle body.

(6) In the aspect according to any one of the above (3) to (5), a bracket, which is coupled to left and right side walls and a bottom wall of the recessed portion, may be provided at the rear side of the vehicle body of the contactor in the recessed portion, and the power supply connector may be fixed within the recessed portion through the bracket.

(7) In the aspect according to any one of the above (3) to (6), the contactor may be provided at a position which overlaps with a side frame, in an upward and downward direction of the vehicle body, extending in the forward and rearward direction of the vehicle body among the vehicle body frames.

(8) In the aspect according to the above (3), the electrically driven vehicle may be a fuel cell vehicle includes a hydrogen tank as the gas tank and a fuel cell which generates electric power using a hydrogen gas filled in the hydrogen tank as a fuel and that drives using the generated electric power by the fuel cell.

In accordance with the aspect of the above (1), since the power supply port and the inverter installation space are provided within the trunk room, the inverter device which is separate from the electrically driven vehicle may move to any location by being loaded into the trunk room and supply the electric power to the external AC device of the electrically driven vehicle. Accordingly, the vehicle power supply system may supply the electric power to the outside at any location without being subject to a restriction of a power supply location.

In addition, since the inverter installation space in the trunk room is provided so that the inverter device may be installed at a position which does not overlap with the power supply port when viewed from the forward and rearward direction of the vehicle, the inverter device may be compactly disposed within the trunk room during power supply and a connection operation of the connector portion of the inverter device to the power supply port may be easily performed.

In the case of the above (2), since the connection cable of the inverter device extends upward from below of the side surface on which the power supply port is disposed, the connector portion may be connected to the power supply port facing downward without forcibly bending the connection cable. Furthermore, since the elastic restoring force of the connection cable acts upward against gravity acting on the connector portion of the front end portion of the connection cable during connection between the power supply port and the connector portion of the connection cable, the connector portion may be fitted to the power supply port by a small force using the elastic restoring force of the connection cable. Accordingly, it may be possible to improve operability during the connection between the power supply port and the connector portion. In addition, since the connection cable of the inverter device extends from the side surface on which the power supply port is disposed, the overall length of the connection cable may be set to be shortened. In particular, in a case of adopting the connection cable having a large diameter for high-voltage and large-current so as to correspond to high-voltage and large-current, a large force is additionally required to bend the connection cable and the cost per unit length of the connection cable increases. Therefore, the aspect according to the present invention is particularly suitable for the vehicle power supply system which supplies high electric power to the outside using the connection cable having a large diameter to handle a high voltage and a large current.

In the case of the above (3), the gas tank is disposed between the pair of rear wheel housings, the gas tank is partitioned from the vehicle interior side by the tank partition panel which is lifted upward toward the front side of the vehicle body from the bottom wall of the trunk room, the recessed portion which is opened upward is provided between the lifting portion of the tank partition panel and one rear wheel housing, and the power supply contactor is disposed within the recessed portion. Therefore, the contactor may be disposed by effectively using the dead space which may be defined between the end portion of the gas tank and the rear wheel housing. Furthermore, the contactor handling the DC power and the gas tank handling the high-pressure gas may be securely partitioned.

In the case of the above (4), the contactor is disposed at a region which overlaps in the forward and rearward direction of the vehicle body with respect to the sub-frame which surrounds the outside of the gas tank. Therefore, the periphery of the gas tank may be protected by the sub-frame, and the front and rear of the contactor may also be securely protected by the sub-frame.

In the case of the above (5), the power supply connector is connected to the contactor by the flexible cable and is disposed at a position spaced apart from the contactor in the trunk room to the rear side of the vehicle body. Therefore, even when a large load is input to the power supply connector portion from rearward of the vehicle body, the large load may be prevented in advance from being transferred to the contactor from the power supply connector. Thus, in accordance with the present invention, the contactor may be further securely protected.

In the case of the above (6), since the bracket, which is coupled to the left and right side walls and the bottom wall of the recessed portion, is provided at the rear side of the vehicle body of the contactor in the recessed portion, and the power supply connector may be fixed within the recessed portion through the bracket, the power supply connector to which a large load is applied during the connection or connection release (insertion or extraction) of the inverter device may have high stiffness to be supported at the vehicle body side.

In the case of the above (7), the contactor is disposed at a portion right above the side frame extending in the forward and rearward direction of the vehicle body among the vehicle body frames (at a position which overlaps with the side frame in the upward and downward direction of the vehicle body). Therefore, the support portion of the contactor may securely have enhanced stiffness by the side frame, and the contactor may be securely protected.

In the case of the above (8), due to the fuel cell vehicle which drives by the fuel cell using the hydrogen gas as a fuel, the hydrogen tank side handling the hydrogen gas and the contactor side may be securely partitioned, and thus the hydrogen gas may be securely prevented from infiltrating into the vehicle interior side.

DESCRIPTION OF EMBODIMENTS

First Embodiment

Figure 1:
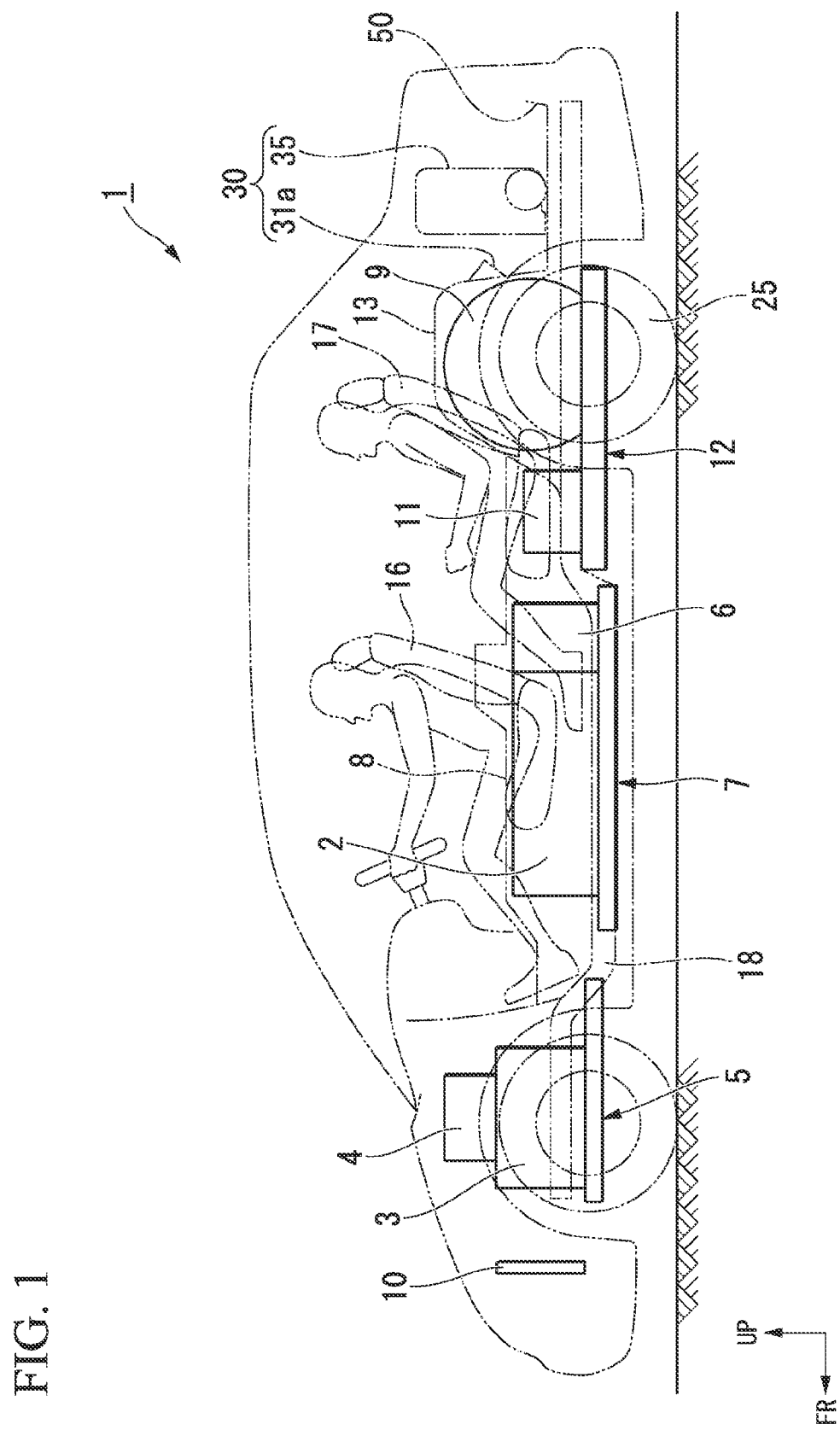
FIG. 1 is a side view illustrating a fuel cell automobile (an electrically driven vehicle) according to a first embodiment of the present invention.

Hereinafter, a fuel cell automobile (an electrically driven vehicle, a fuel cell vehicle) according to a first embodiment of the present invention will be described with reference to the accompanying drawings. In the following description, directions such as "forward, rearward, left, and right directions" are the same as the directions in the vehicle unless indicated otherwise. Also, a central arrow FR, an arrow LH, and an arrow UP respectively refer to the forward direction, the left direction, and the upward direction of the vehicle, in the drawings.

FIG. 1 is a side view illustrating a fuel cell automobile 1 (an electrically driven vehicle, a fuel cell vehicle) according to the embodiment. In FIG. 1, reference numerals 16 and 17 are a front seat and a rear seat in a vehicle interior, respectively.

Figure 2:
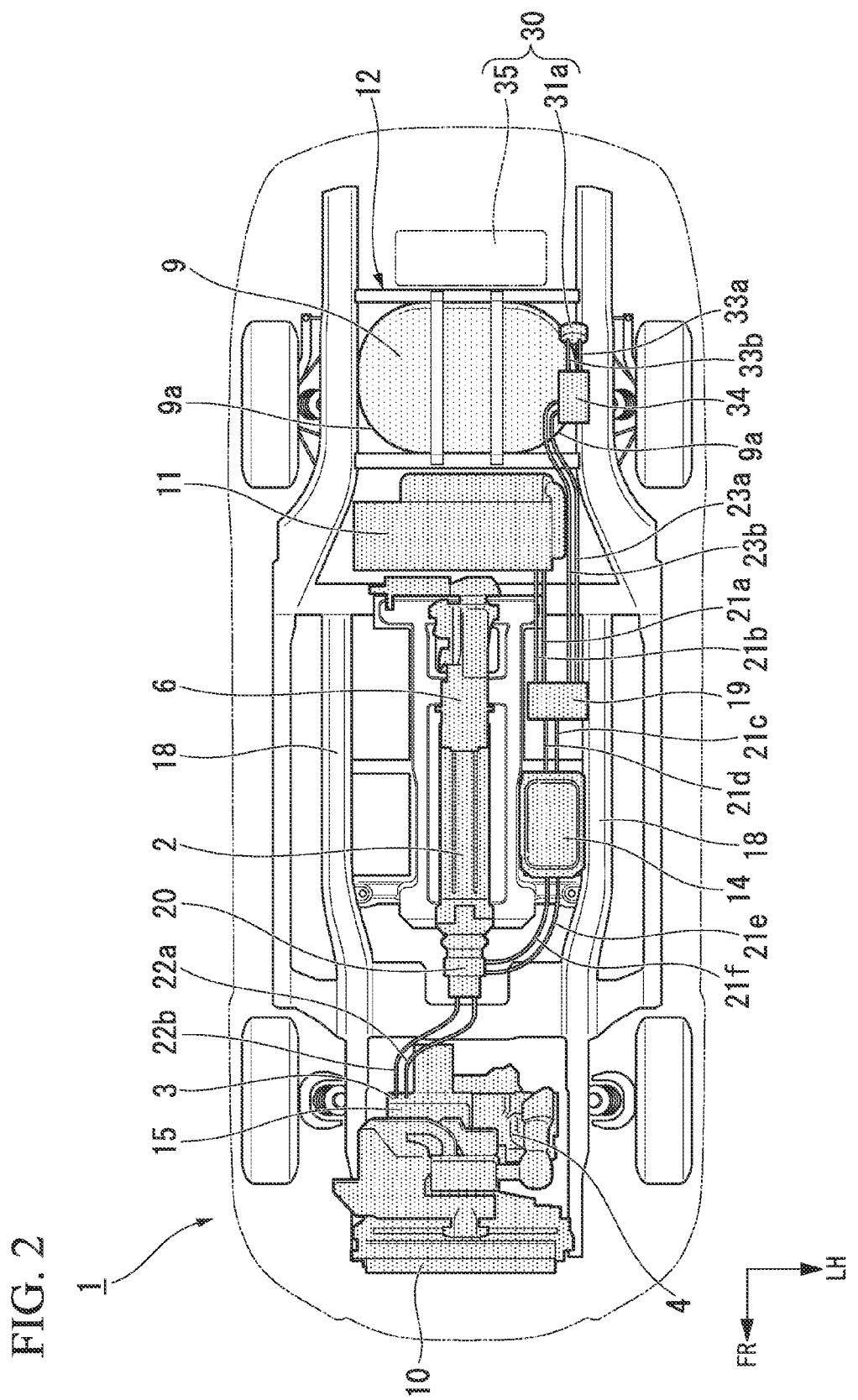
FIG. 2 is a top view illustrating the same fuel cell automobile (the electrically driven vehicle).

FIG. 2 is a top view illustrating the fuel cell automobile 1.

As shown in FIG. 1, the fuel cell automobile 1 is to mount a fuel cell stack 2 (hereinafter, referred to as "a fuel cell 2"), which generates electric power by an electrochemical reaction between hydrogen and oxygen, beneath the floor of a vehicle body. The fuel cell automobile 1 is driven by driving a drive motor 3 with the electric power generated by the fuel cell 2.

The fuel cell automobile 1 includes a power supply port 31a which is electrically connected to the fuel cell 2 (a DC power source) within a rear trunk room 50 of the vehicle. An inverter device 35, which is provided separately from the fuel cell automobile 1, may be mounted within the trunk room 50.

The inverter device 35 is electrically connected to the power supply port 31a of the fuel cell automobile 1, and thus the fuel cell automobile 1 and the inverter device 35 configure a vehicle power supply system 30 which converts DC power of the fuel cell 2 into AC power and supplies the AC power to an external AC device. The vehicle power supply system 30 will be described in detail later.

The fuel cell 2 is a known solid PEMFC (Polymer Electrolyte Membrane Fuel Cell) which is made by laminating a plurality of unit fuel cells (unit cells). By supplying a hydrogen gas as a fuel gas to an anode side of the fuel cell and supplying air containing oxygen as an oxidant gas to a cathode side of the fuel cell, the fuel cell 2 generates electric power together with the generation of water by electrochemical reaction.

In the fuel cell automobile 1, left and right main frames 18 and 18 of the vehicle are coupled with a front sub-frame 5, a center sub-frame 7, and a rear sub-frame 12. Each of the front sub-frame 5, the center sub-frame 7, and the rear sub-frame 12 is a frame unit formed in a substantially rectangular frame shape by a plurality of beam materials when viewed from the top.

In the front of the vehicle interior, the front sub-frame 5 supports a drive motor 3 which is a drive source of the vehicle and a compressor 4 which compresses the air supplied to the cathode side of the fuel cell 2. A radiator 10 to cool cooling water which circulates through the fuel cell 2 and the like is disposed in front of the drive motor 3 and the compressor 4.

The center sub-frame 7 supports the fuel cell 2 and auxiliary devices 6 of the fuel cell 2 at the lower surface side (the outside of the vehicle interior) of a floor panel 8 of an intermediate portion of the vehicle body in the forward and rearward direction thereof. The auxiliary devices 6 for the fuel cell 2 are an auxiliary hydrogen supply device such as a regulator or an ejector and an auxiliary air discharge device such as a humidifier or a dilution box.

The rear sub-frame 12 mainly supports a battery 11 to accumulate regenerative electric power from the drive motor 3 during the deceleration of the fuel cell automobile 1 and a hydrogen tank 9 (a gas tank) to supply the hydrogen to the fuel cell 2 at the lower surface side (the outside of the vehicle interior) of a rear floor panel 13 of a rear portion of the vehicle body.

As shown in FIG. 2, in the drive motor 3 supported by the front sub-frame 5 (see FIG. 1), the drive and regeneration of the drive motor 3 are controlled by a PDU (Power Drive Unit) 15 depending on driving conditions of the vehicle, electric energy from the fuel cell 2 and the battery 11, or the like. Since the PDU 15 includes an inverter made of a switching element such as a transistor or a FET (Field Effect Transistor), the PDU 15 converts the DC power from the battery 11 or the fuel cell 2 into desired AC power.

The fuel cell 2 supported by the center sub-frame 7 (see FIG. 1) is electrically connected to a main contactor box 20 disposed frontward of the fuel cell 2. In addition, the battery 11 supported by the rear sub-frame 12 is electrically connected to the main contactor box 20 through high-voltage cables 21a to 21f, a junction box 19, and a DC/DC converter 14. Furthermore, the main contactor box 20 is electrically connected to the PDU 15 through high-voltage cables 22a and 22b. Accordingly, the fuel cell 2 and the battery 11 are electrically connected to the PDU 15.

The junction box 19 is electrically connected to a power supply contactor box 34 to be described later and the power supply port 31a through high-voltage cables 23a and 23b. The junction box 19 divides the electric power of the fuel cell 2 and supplies the divided electric power to the power supply contactor box 34 and the power supply port 31a.

The DC/DC converter 14 performs voltage regulation between the PDU 15, the fuel cell 2, and the battery 11 depending on the driving conditions of the vehicle, the electric energy of the fuel cell 2 and the battery 11, or the like.

The main contactor box 20 turns ON/OFF a contactor (not shown) in the main contactor box 20 as necessary, thereby allowing the fuel cell 2 and the battery 11 to be electrically connected to or cut off from the PDU 15.

The PDU 15 or the DC/DC converter 14, the main contactor box 20, and the like are connected to an ECU (Electrical Control Unit) which is not shown and controls an overall operation of this fuel cell system. The ECU performs the electric power generation control in the fuel cell 2 or the regenerative electric power control in the drive motor 3 by controlling the drive of each component based on a throttle opening signal, a brake signal, a vehicle speed signal, and so on.

The hydrogen tank 9 supported by the rear sub-frame 12 has a substantially cylindrical shape, and axial end surfaces thereof 9*a* and 9*a* have a spherical shape. The hydrogen tank 9 is inside the main frames 18 and 18 in the vehicle width direction when viewed from the top so that the axis of the hydrogen tank 9 faces in the left and right direction of the fuel cell automobile 1, and is disposed within the limits surrounded by the rear sub-frame 12. Accordingly, the hydrogen tank 9 has high stiffness in the vicinity thereof, thereby being protected even when an impact is applied to the fuel cell automobile 1.

Figure 3:
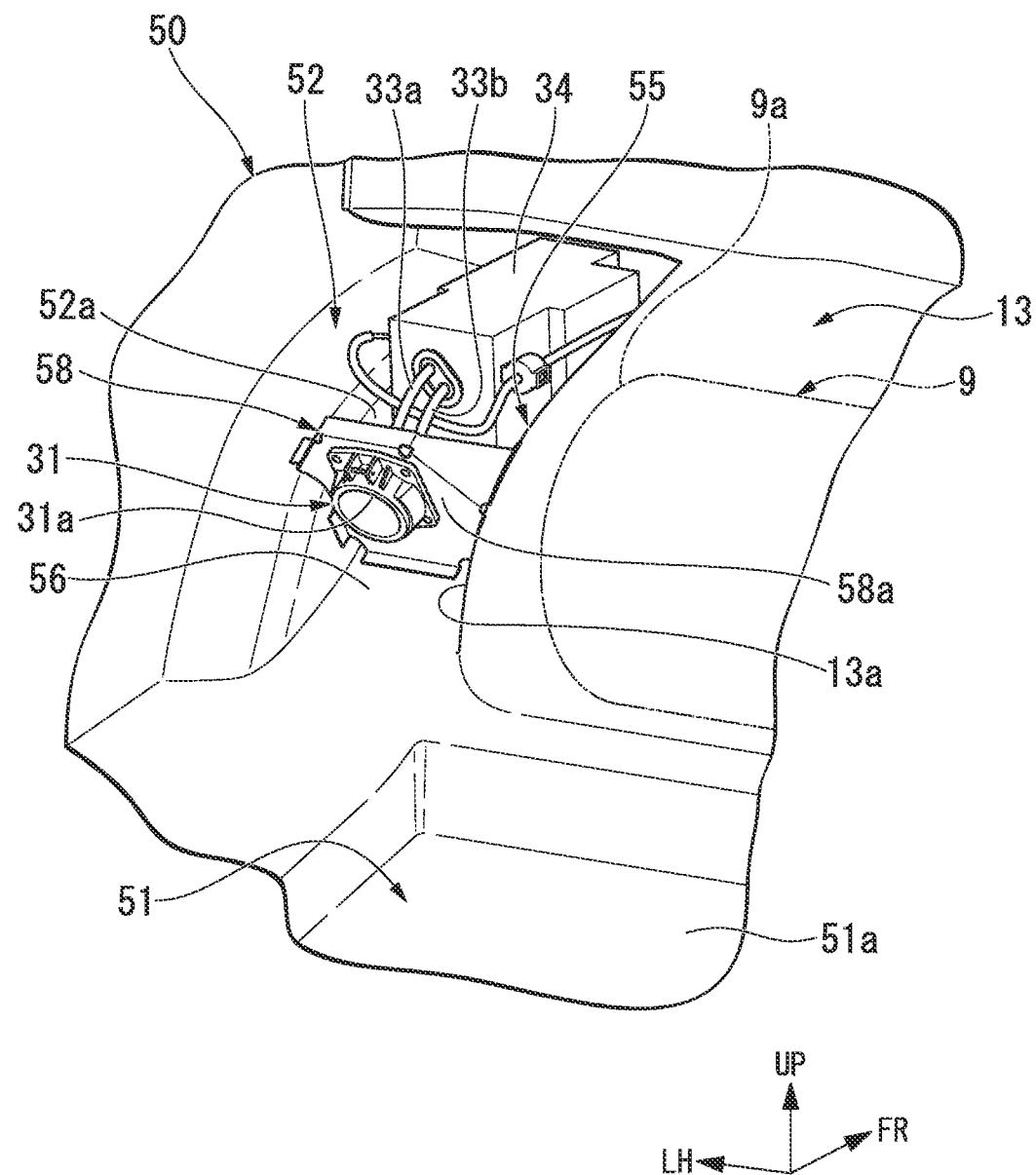
FIG. 3 is a view illustrating a trunk room.

FIG. 3 is a view illustrating the trunk room 50. In FIG. 3, the hydrogen tank 9, which is disposed at the lower surface side (the outside of the vehicle interior) of the rear floor panel 13, is indicated by the line of alternating one long dash and two short dashes.

As shown in FIG. 3, the trunk room 50 provided rearward of the vehicle is formed in a bathtub shape having a bottom. The bottom 51 is integrally formed with the rear floor panel 13 covering the hydrogen tank 9. The bottom 51 of the trunk room 50 is provided with an inverter installation space 51*a* into which the inverter device 35 (see FIG. 1) provided separately from the fuel cell automobile 1 may be installed. That is, similarly to a conventional vehicle, a user's load may be stored and the inverter device 35 (see FIG. 1) may be installed in the trunk room 50.

The rear floor panel 13 is inside (at the right in FIG. 3) more than a wheel housing 52 covering a rear wheel 25 (see FIG. 1) in the vehicle width direction when viewed from the outside of the trunk room 50, and is formed to cover the hydrogen tank 9 along an external shape thereof.

Since the axial end surface 9*a* of the hydrogen tank 9 has a spherical shape, an upper side region of the axial end surface 9*a* of the hydrogen tank 9 (the axial end surface 9*a* of the LH side of the hydrogen tank 9 in the embodiment) and the wheel housing 52 are spaced apart from each other in a state of having a relatively large space therebetween. The rear floor panel 13 is formed along the axial end surface 9*a* of the hydrogen tank 9, and thus a recessed portion 55 which is recessed downward is formed between the wheel housing 52 and the axial end surface 9*a* of the hydrogen tank 9.

The recessed portion 55 is formed by a right surface 52*a* of the wheel housing 52, a left surface 13*a* of the rear floor panel 13, and a bottom panel 56. The recessed portion 55 is inside the main frames 18 and 18 (see FIG. 2) in the vehicle width direction when viewed from the top and within the limits of the rear sub-frame 12 (see FIG. 2). The recessed portion 55 is formed outside (at the LH side in the embodiment) more than the inverter installation space 51*a* in the vehicle width direction.

The bottom panel 56 of the recessed portion 55 is integrally formed with the rear floor panel 13. The bottom panel 56 may also be integrally formed with the wheel housing 52, or may also be formed separately from the wheel housing 52 and the rear floor panel 13.

[Vehicle Power Supply System and Power Supply Port]

The vehicle power supply system 30 is provided and the power supply port 31*a* which is connected to a connector portion 38 (see FIG. 5) of the inverter device 35 is disposed within the recessed portion 55. The power supply port 31*a* is formed at a power supply connector 31. The power supply connector 31 is a so-called high-voltage connector which has a female type terminal made of metal such as copper inside a cylindrical-shaped housing made of an insulator such as resin for example. The power supply port 31*a* is provided with a fitting detection mechanism such as a microswitch (not shown) for example, and thus the fitting between the power supply port 31*a* and the connector portion 38 (see FIG. 5) of the inverter device 35 may be detected.

The power supply connector 31 is attached within the recessed portion 55 by a bracket 58 made of a plate material so that the power supply port 31*a* faces rearward and downward of the fuel cell automobile 1. Specifically, the power supply connector 31 is fixed to an attachment seat surface 58*a* of the bracket 58, which faces rearward and downward of the fuel cell automobile 1, by, for example, a bolt (not shown). In addition, the bracket 58 is fixed to the right surface 52*a* of the wheel housing 52, the left surface 13*a* of the rear floor panel 13, and the bottom panel 56, which form the recessed portion 55, by, for example, welding. Thereby, the power supply connector 31 is strongly fixed within the recessed portion 55 in a state in which the power supply port 31*a* faces rearward and downward of the fuel cell automobile 1. Accordingly, the power supply connector 31 may sufficiently take an insertion and extraction load during insertion or extraction of the connector portion 38 (see FIG. 5) of the inverter device 35 which is a high-voltage connector. Therefore, the inverter device 35 may be securely connected to or cut off from the power supply port 31*a*.

The power supply port 31*a* is electrically connected to the power supply contactor box 34 through high-voltage cables 33*a* and 33*b*. The power supply contactor box 34 is fixed within the recessed portion 55 through a bracket (not shown). As shown in FIG. 2, the power supply contactor box 34 is electrically connected to the fuel cell 2 through the high-voltage cables 23*a* and 23*b*, the junction box 19, or the like. Consequently, the power supply port 31*a* is electrically connected to the fuel cell 2.

The power supply contactor box 34 turns ON/OFF a contactor (not shown) in the power supply contactor box 34 as necessary, thereby allowing the fuel cell 2 to be electrically connected to or cut off from the power supply port 31*a*. Specifically, when the fitting detection mechanism of the power supply port 31*a* detects connection between the power supply port 31*a* and the connector portion 38 (see FIG. 5) of the inverter device 35, the power supply contactor box 34 turns ON the contactor to electrically connect the fuel cell 2 and the power supply port 31*a*. Thereby, the DC power is supplied from the fuel cell 2 to the inverter device 35. In addition, in a normal state in which the power supply port 31*a* is not connected to the connector portion 38 of the inverter device 35, the power supply contactor box 34 turns OFF the contactor to electrically cut off the fuel cell 2 and the power supply port 31*a*.

As described above, the recessed portion 55 is formed inside the main frames 18 and 18 (see FIG. 2) in the vehicle width direction when viewed from the top and within the limits of the rear sub-frame 12 (see FIG. 2). Accordingly, the power supply port 31*a* and the power supply contactor box 34 within the recessed portion 55 are also disposed inside the main frames 18 and 18 (see FIG. 2) in the vehicle width direction and within the limits of the rear sub-frame 12 (see FIG. 2). Therefore, the power supply port 31a and the power supply contactor box 34 have stiffness in the vicinity thereof, thereby being protected even when an impact is applied to the fuel cell automobile 1.

In addition, the recessed portion 55 is formed outside (at the LH side) more than the inverter installation space 51a in the vehicle width direction. Accordingly, the power supply port 31a and the power supply contactor box 34 within the recessed portion 55 are also disposed outside (at the LH side) more than the inverter installation space 51a in the vehicle width direction. Thereby, when the inverter device 35 (see FIG. 2) is installed in the inverter installation space 51a, the power supply port 31a is disposed outside (at the LH side) more than the inverter device 35 in the vehicle width direction. That is, the inverter device 35 is installed within the trunk room 50 so as not to overlap with the power supply port 31a when viewed from the forward and rearward direction of the fuel cell automobile 1.

Figure 4:
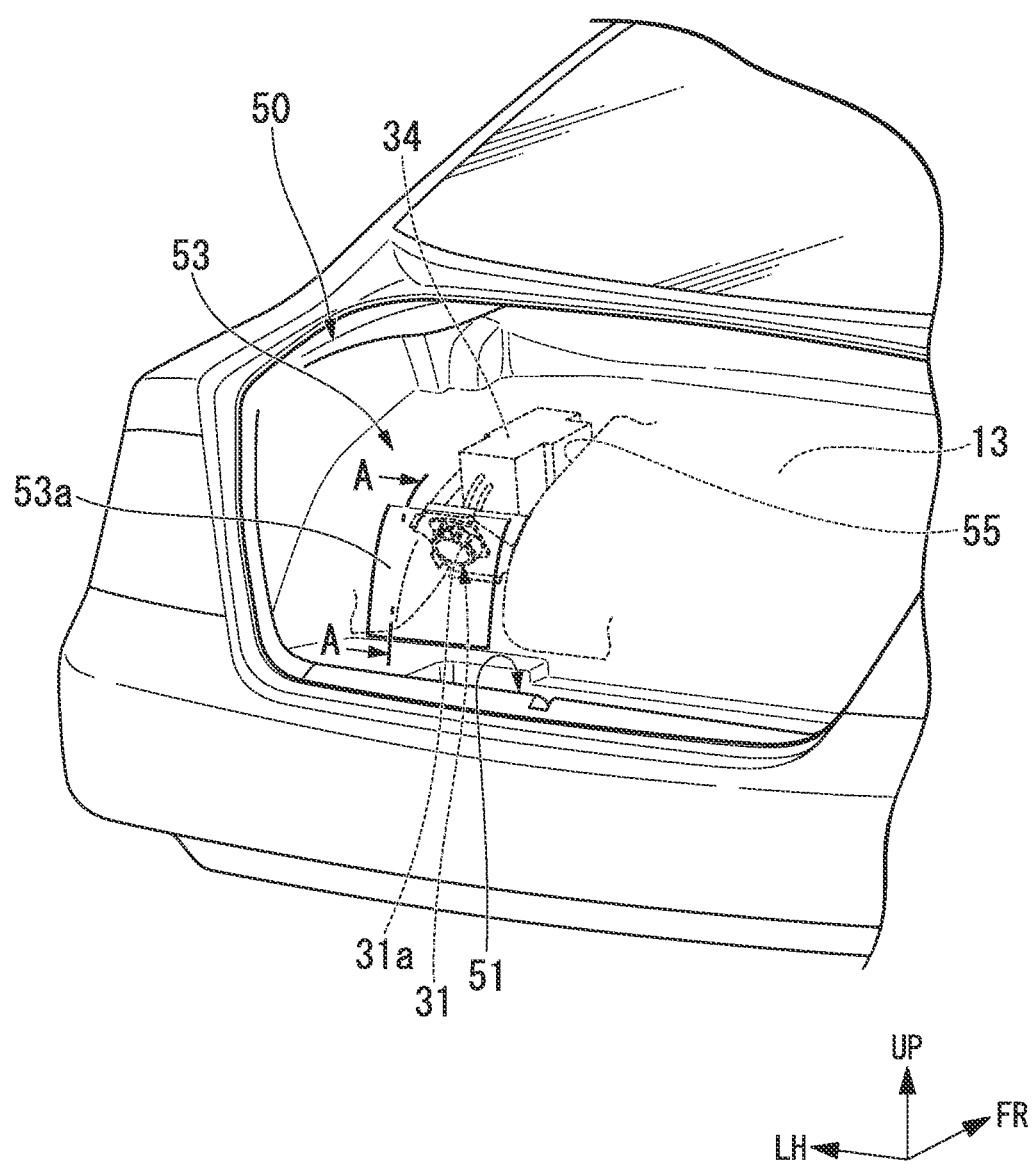
FIG. 4 is a view illustrating the trunk room when a trunk carpet is laid.

FIG. 4 is a view illustrating the trunk room 50 when a trunk carpet 53 is laid. In FIG. 4, the recessed portion 55, the power supply port 31a, and the power supply contactor box 34 are indicated by the line of alternating one long dash and two short dashes.

Figure 5:
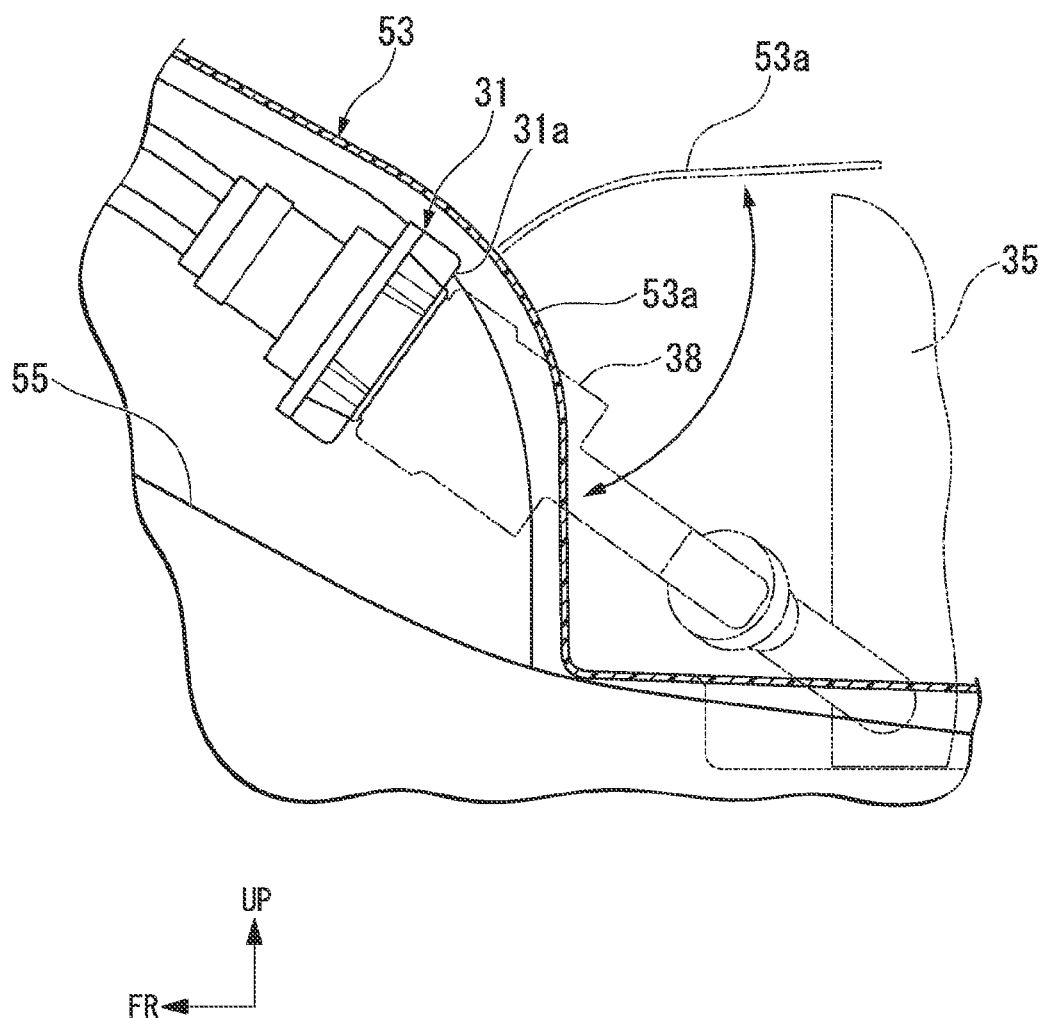
FIG. 5 is a cross-sectional view taken along line A-A of FIG. 4.

FIG. 5 is a cross-sectional view taken along line A-A of FIG. 4. In FIG. 5, an opened lid 53a, the inverter device 35, and the connector portion 38 are indicated by the line of alternating one long dash and two short dashes.

As shown in FIG. 4, when the trunk carpet 53, which mainly covers the rear floor panel 13, is laid within the trunk room 50, the power supply port 31a and the power supply contactor box 34 are disposed so as not to be exposed to the outside from the trunk carpet 53.

The trunk carpet 53 is formed with the openable and closable lid 53a at a position corresponding to the recessed portion 55. As shown in FIG. 5, the power supply port 31a is generally closed by the lid 53a. When being connected to the connector portion 38 of the inverter device 35, the power supply port 31a is exposed by opening the lid 53a.

[Vehicle Power Supply System and Inverter Device]

Figure 6:
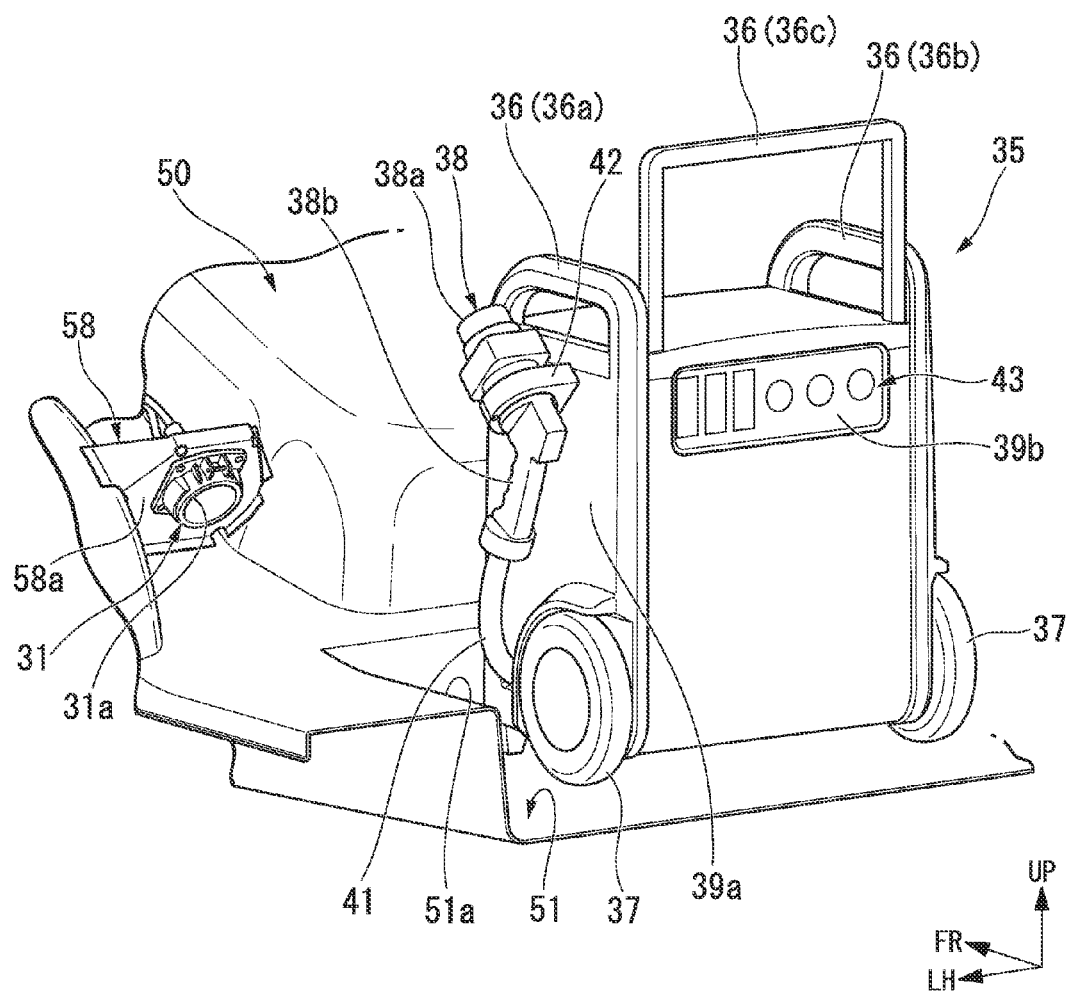
FIG. 6 is a perspective view illustrating an external appearance when an inverter device is installed.

FIG. 6 is a perspective view illustrating an external appearance when the inverter device 35 is installed. FIG. 6 shows a state in which the connector portion 38 of the inverter device 35 and the power supply port 31a are not connected to each other. In addition, the trunk carpet 53 is not shown.

The inverter device 35 includes a switching element such as a transistor or a FET therein, and converts the DC power supplied from the fuel cell 2 into the AC power.

As shown in FIG. 6, the inverter device 35 is provided separately from the fuel cell automobile 1, and is formed to be movable separately from the fuel cell automobile 1. The inverter device 35 has a substantially box shape and is formed to a size which may be disposed in the inverter installation space 51a formed on the bottom 51 in the trunk room 50.

The inverter device 35 is installed in the inverter installation space 51a within the trunk room 50 when in use. In addition, since the inverter device 35 is formed separately from the fuel cell automobile 1, the trunk room 50 may be effectively utilized by unloading the inverter device 35 from the trunk room 50 of the fuel cell automobile 1 when does not in use.

The inverter device 35 is provided, at a plurality of positions (three positions in the embodiment) of an upper portion thereof, with grasp portions 36 (36a to 36c) having a rectangular frame shape. In addition, the inverter device 35 is provided, at a lower portion thereof, with a pair of wheels 37 and 37. The wheels 37 and 37 of the inverter device 35 are placed on the ground and the grasp portions 36 are grasped to be drawn, and thereby the inverter device 35 may be easily moved.

In addition, the inverter device 35 may be easily loaded into the trunk room 50 by grasping the grasp portions 36 and lifting the inverter device 35.

The inverter device 35 is provided with a connection cable 41 which is formed by bundling a plurality of cables. When the inverter device 35 is installed in the inverter installation space 51a, the connection cable 41 extends upward from below of a side surface 39a (a side surface of the LH side in the embodiment) on which the power supply port 31a is disposed among a plurality of side surfaces of the inverter device 35.

The connector portion 38 is formed at a front end portion of the connection cable 41. The connector portion 38 is configured by a fitting portion 38a which may be fitted to the power supply port 31a in the trunk room 50, and a grip portion 38b which is provided at the base end side of the connection cable 41 more than the fitting portion 38a, thereby being formed in a substantially L-shape so that the fitting portion 38a faces the front of the vehicle.

The fitting portion 38a is a so-called high-voltage connector which has a male type terminal made of metal such as copper inside a cylindrical-shaped housing made of an insulator such as resin for example. The inverter device 35 is electrically connected to the power supply port 31a by fitting the fitting portion 38a to the power supply port 31a.

Accordingly, the inverter device 35 is electrically connected to the fuel cell 2 through the power supply contactor box 34, the high-voltage cables 23a and 23b, or the like (see FIG. 2).

The grip portion 38b is integrally formed with the fitting portion 38a. The grip portion 38b is formed, on a surface thereof, with irregularities so as to be easily grasped by a user. Accordingly, the grip portion 38b may sufficiently give an insertion and extraction load during the connector portion 38 of the inverter device 35 being inserted into or extracted from the power supply connector 31 which is a high-voltage connector.

Therefore, the inverter device 35 may be securely connected to or cut off from the power supply port 31a.

The connector portion 38 is attachable and detachable with respect to a clamp portion 42 which is provided upward of the side surface 39a of the inverter device 35. The connector portion 38 is attached to the clamp portion 42 during transport of the inverter device 35, and thereby the connection cable 41 and the connector portion 38 are suppressed from swing during the transport to prevent damage thereto.

An AC power output portion 43 is formed on a side surface 39b which faces the rear of the fuel cell automobile 1 among the plural side surfaces of the inverter device 35. The AC power output portion 43 is connected with an external AC device (not shown) to which the AC power output from the inverter device 35 is supplied.

Figure 7:
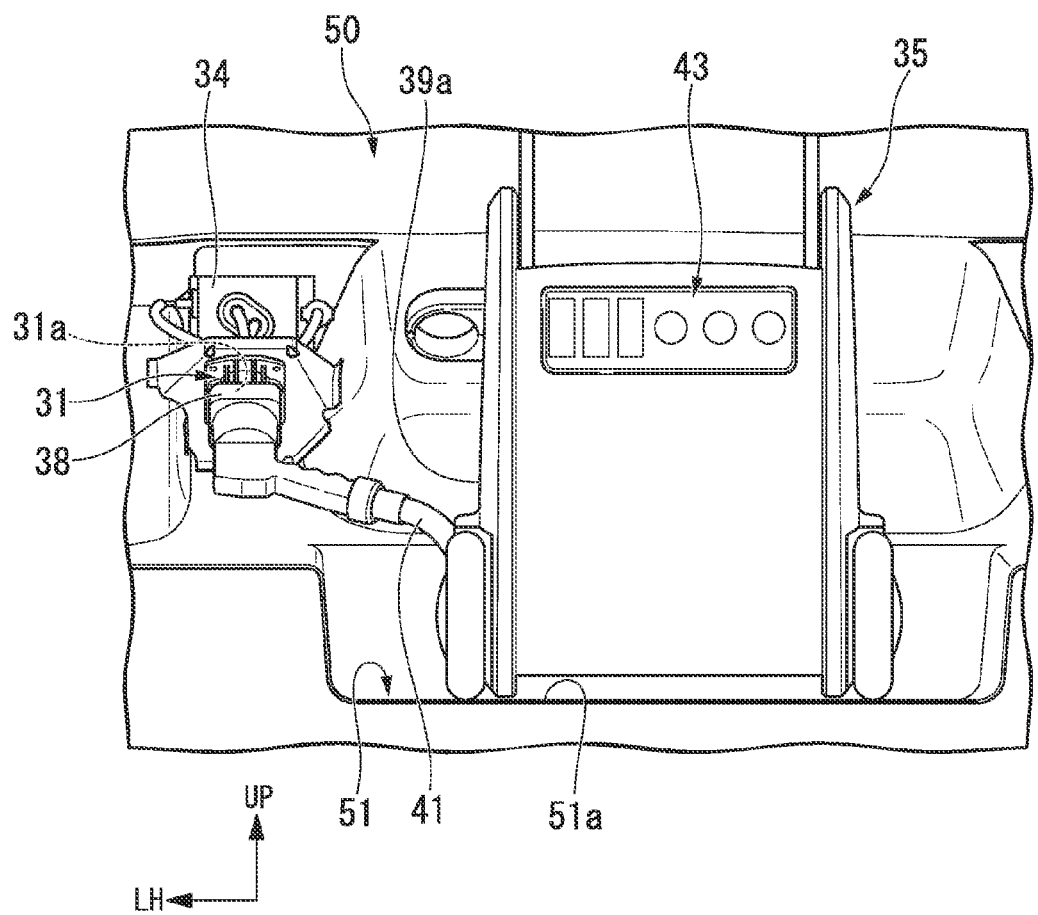
FIG. 7 is a view when viewed from the rear of the vehicle when the inverter device is installed.

FIG. 7 is a view when viewed from the rear of the vehicle when the inverter device 35 is installed. FIG. 7 shows a state in which the connector portion 38 of the inverter device 35 and the power supply port 31a are connected to each other.

As shown in FIG. 7, the inverter device 35 is installed inside more than the power supply port 31a in the vehicle width direction when viewed from the rear of the vehicle. The connection cable 41 of the inverter device 35 extends upward from below of the side surface 39a on which the power supply port 31a is disposed, and is thus connected to the power supply port 31a facing downward without forcibly bending the connection cable 41.

In addition, the inverter device 35 is installed so as not to overlap with the power supply port 31a when viewed from the rear of the vehicle. Accordingly, when a user connects the connector portion 38 of the inverter device 35 to the power supply port 31a, a connection operation may be easily achieved without interference with the inverter device 35 itself.

Furthermore, since the AC power output portion 43 is disposed to face rearward of the vehicle when the inverter device 35 is installed, the AC power output portion 43 may be easily connected to the external AC device (not shown).

[Effects]

In accordance with the embodiment as described above, since the power supply port 31a and the inverter installation space 51a are provided within the trunk room 50, the inverter device 35 which is separate from the fuel cell automobile 1 may be moved to any location by being loaded into the trunk room 50 and supply the electric power to the external AC device of the fuel cell automobile 1. Accordingly, the vehicle power supply system 30 of the embodiment may supply electric power to the outside at any location without being subject to a restriction of a power supply location.

In addition, since the inverter installation space 51a in the trunk room 50 is provided so that the inverter device 35 may be installed at a position which does not overlap with the power supply port 31a when viewed from the forward and rearward direction of the vehicle, the inverter device 35 may be compactly disposed within the trunk room 50 during power supply and a connection operation of the connector portion 38 of the inverter device 35 to the power supply port 31a may be easily performed.

In addition, since the connection cable 41 of the inverter device 35 extends upward from below of the side surface 39a on which the power supply port 31a is disposed, the connector portion 38 may be connected to correspond to the power supply port 31a facing downward without the connection cable 41 being forcibly bent. Furthermore, since the elastic restoring force of the connection cable 41 acts upward against gravity acting on the connector portion 38 of the front end portion of the connection cable 41 during connection between the power supply port 31a and the connector portion 38 of the connection cable 41, the connector portion 38 may be fitted to power supply port 31a by a small force using the elastic restoring force of the connection cable 41. Accordingly, it may be possible to improve operability during the connection between the power supply port 31a and the connector portion 38. In addition, since the connection cable 41 of the inverter device 35 extends from the side surface 39a on which the power supply port 31a is disposed, the overall length of the connection cable 41 may be set to be shortened. In particular, in a case of adopting the connection cable 41 having a large diameter for high-voltage and large-current so as to correspond to high-voltage and large-current, a large force is additionally required to bend the connection cable 41 and the cost per unit length of the connection cable 41 increases. Therefore, the present invention is particularly suitable for the vehicle power supply system 30 which supplies high electric power to the outside using the connection cable 41 which has a large diameter to handle a high voltage and a large current.

Second Embodiment

Hereinafter, an electrically driven vehicle according to a second embodiment of the present invention will be described with reference to the accompanying drawings. In the following description, directions such as "forward, rearward, left, and right directions" are the same as the directions in the vehicle unless indicated otherwise. Also, a central arrow FR, an arrow LH, and an arrow UP respectively refer to the forward direction, left direction, and upward direction of the vehicle, in the drawings.

The electrically driven vehicle according to the embodiment is a fuel cell automobile (a fuel cell vehicle) 101 using a fuel cell 102 as a main power source for driving the vehicle.

Figure 8:
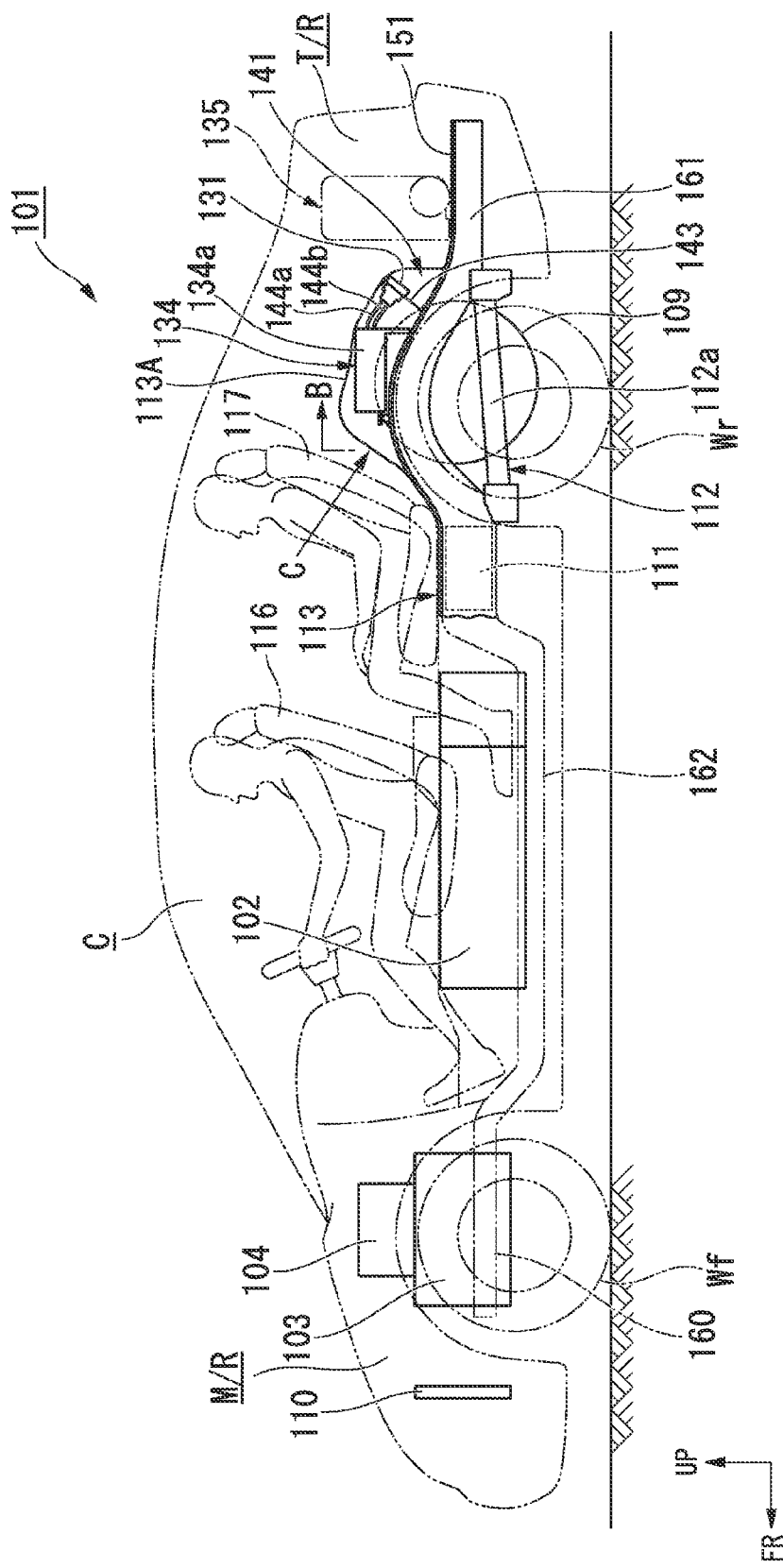
FIG. 8 is a side view schematically illustrating an electrically driven vehicle according to a second embodiment of the present invention.
Figure 9:
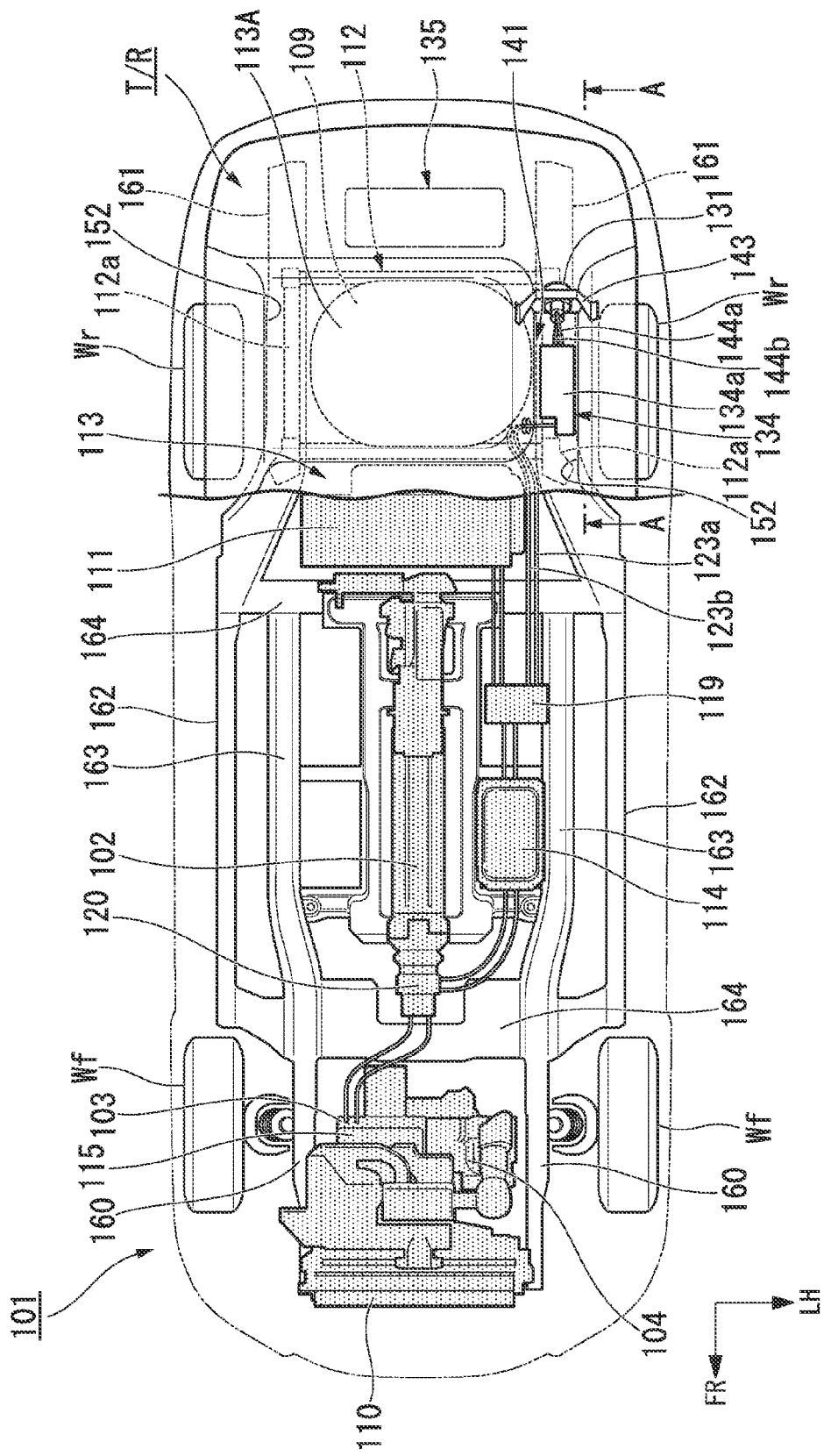
FIG. 9 is a top view schematically illustrating the same electrically driven vehicle.

FIGS. 8 and 9 are a side view and a top view schematically illustrating a configuration of the fuel cell automobile 101. In more detail, FIG. 8 is a side view schematically illustrating the whole vehicle which shows a cross-section of an only rear portion of a vehicle body taken along portion A-A of FIG. 9, and FIG. 9 is a top view schematically illustrating the whole vehicle when viewing the only rear portion of the vehicle body from above of a floor. In the drawings, reference symbols Wf and Wr are a front wheel and a rear wheel of the fuel cell automobile 101, and reference numerals 116 and 117 are a front seat and a rear seat in a cabin C.

The fuel cell automobile 101 includes the fuel cell 102 (a fuel cell stack or a DC power source) mounted thereon, which generates electric power by an electrochemical reaction between hydrogen and oxygen, beneath a floor tunnel of the vehicle body. The fuel cell automobile 101 drives a drive motor 103 with the electric power generated by the fuel cell 102.

The fuel cell 102 is a known solid PEMFC (Polymer Electrolyte Membrane Fuel Cell) which is made by laminating a plurality of unit fuel cells (unit cells). By supplying hydrogen gas as a fuel gas to an anode side thereof and supplying air containing oxygen as an oxidant gas to a cathode side thereof, the fuel cell 102 generates electric power by electrochemical reaction.

In addition, the fuel cell automobile 101 is provided with a motor room M/R which stores the drive motor 103 at the front of the cabin C where passengers board as shown in FIG. 8, and is provided with a trunk room T/R to store a load at the rear of the cabin C.

A pair of front side frames 160 extending in the forward and rearward direction of the vehicle body is disposed at both sides in the motor room M/R in the vehicle width direction. The drive motor 103, a compressor 104 to supply compressed air to the cathode side of the fuel cell 102, a suspension device of the front side, and the like are attached to both front side frames 160 through a front sub-frame (not shown).

In the drawings, reference numeral 110 is a radiator which is disposed in front of the motor room M/R and cools cooling water circulating through the fuel cell 102 and the like.

Rear side frames 161 (side frames or vehicle body frames) extending in the forward and rearward direction of the vehicle body are disposed at both lower sides of the trunk room T/R. The front side frames 160 and the rear side frames 161 disposed at the same left and right sides in the vehicle width direction are connected by side sills 162 disposed downward of side portions of the cabin C. In addition, a pair of floor frames 163 extending in the forward and rearward direction of the vehicle body is disposed inside the left and right side sills 162 in the vehicle width direction. These floor frames 163 are coupled to the left and right side sills 162 through a cross member 164 extending in the vehicle width direction. The fuel cell 102 is supported by a center subframe (not shown) attached to the left and right floor frames 163.

The vehicle frames of the fuel cell automobile 101 according to the embodiment are configured by the front side frames 160, the rear side frames 161, the side sills 162, the floor frames 163, the cross member 164, and the like.

In addition, a battery 111 (a DC power source), which accumulates regenerative electric power from the drive motor 103 during the deceleration of the fuel cell automobile 101 and supplies the electric power to each component of the vehicle as necessary, is mounted beneath the floor below the rear seat 117 of the cabin C.

A hydrogen tank 109 (a gas tank) to supply the hydrogen gas to the fuel cell 102 is disposed in a space beneath the floor which is between the cabin C and the trunk room T/R at the rear side of a mounting position of the battery 111. The hydrogen tank 109 has a substantially cylindrical shape, and both axial end portions thereof have a spherical shape. The hydrogen tank 109 is mounted to the fuel cell automobile 101 so that the center axis direction of the hydrogen tank is along the vehicle width direction.

The hydrogen tank 109 is attached to the left and right rear side frames 161 through a rear sub-frame 112 (sub-frame). The rear sub-frame 112 is formed in a rectangular frame shape to surround the outside of the hydrogen tank 109. Left and right side frame portions 112*a* of the rear sub-frame 112 along the forward and rearward direction of the vehicle body are coupled to lower surfaces of the corresponding rear side frames 161.

Incidentally, as shown in FIG. 9, the battery 111 and a power supply portion of the fuel cell 102 are connected to the drive motor 103 through a main contactor 120 to perform the connection or cut-off of the electric power. In the drive motor 103, the drive and regeneration of the drive motor 103 are controlled by a PDU (Power Drive Unit) 115 depending on driving conditions of the vehicle, electric energy from the fuel cell 102 and the battery 111, or the like. Since the PDU 115 includes an inverter made of a switching element such as a transistor or a FET (Field Effect Transistor), the PDU 115 converts the DC power from the battery 111 or the fuel cell 102 into desired AC power.

In addition, a DC/DC converter 114 for power conversion is interposed between the fuel cell 102 and the battery 111. In the middle of a power passage which connects the DC/DC converter 114 and the battery 111, high-voltage cables 123*a* and 123*b* for supplying the electric power to the outside are divided and connected through a junction box 119.

The high-voltage cables 123*a* and 123*b* are connected with a power supply connector 131 through a power supply contactor 134 (a contactor). The power supply connector 131 is a component to which a separate inverter device 135 from the vehicle is connected, and is disposed at a position facing the inside of the trunk room T/R. The inverter device 135 is a device which converts the electric power into AC power from a DC power source (the fuel cell 102 or the battery 111) of the fuel cell automobile 101. The inverter device 135 may supply electric power to an external AC device by being connected to the power supply connector 131, as necessary.

Figure 10:
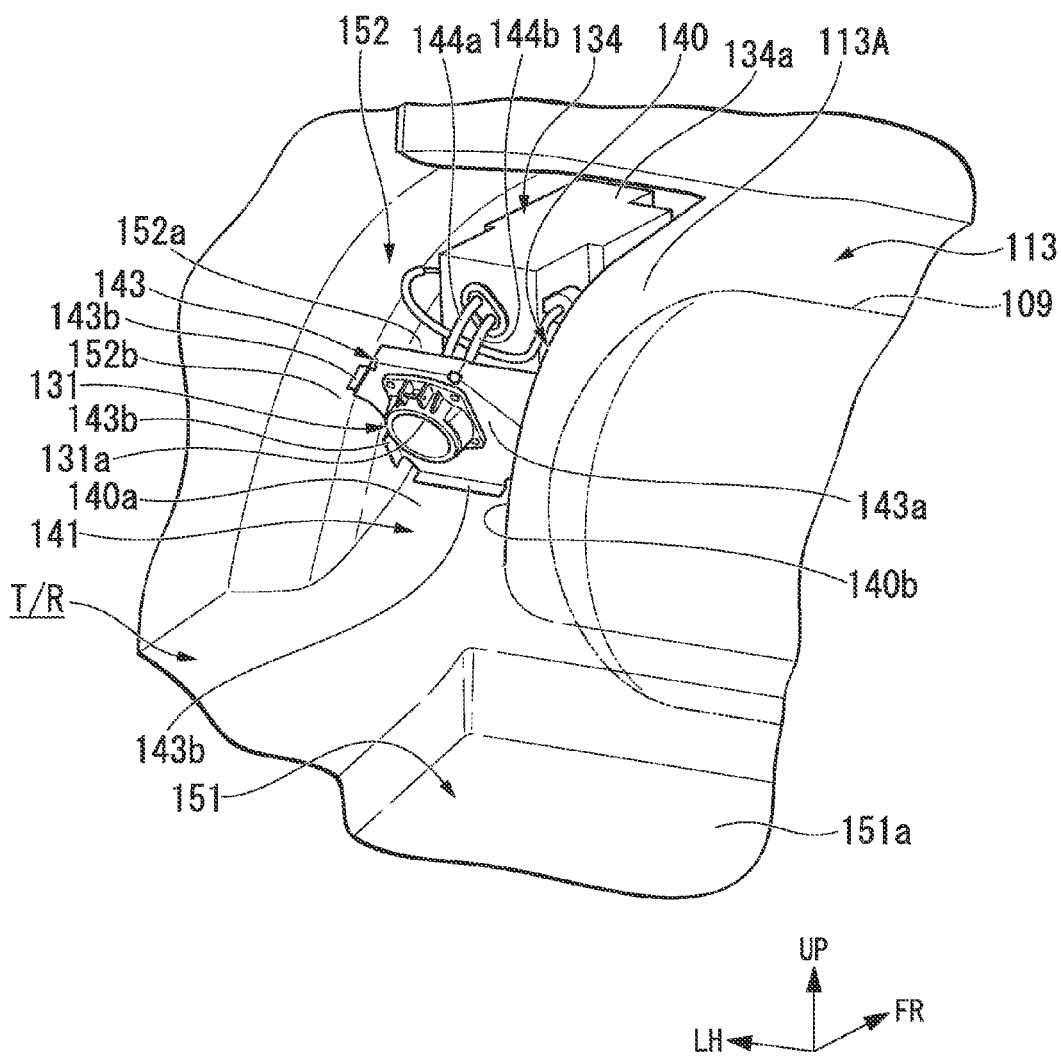
FIG. 10 is a perspective view illustrating a portion within a trunk room of the same electrically driven vehicle when viewed from the rear side of a vehicle body.
Figure 11:
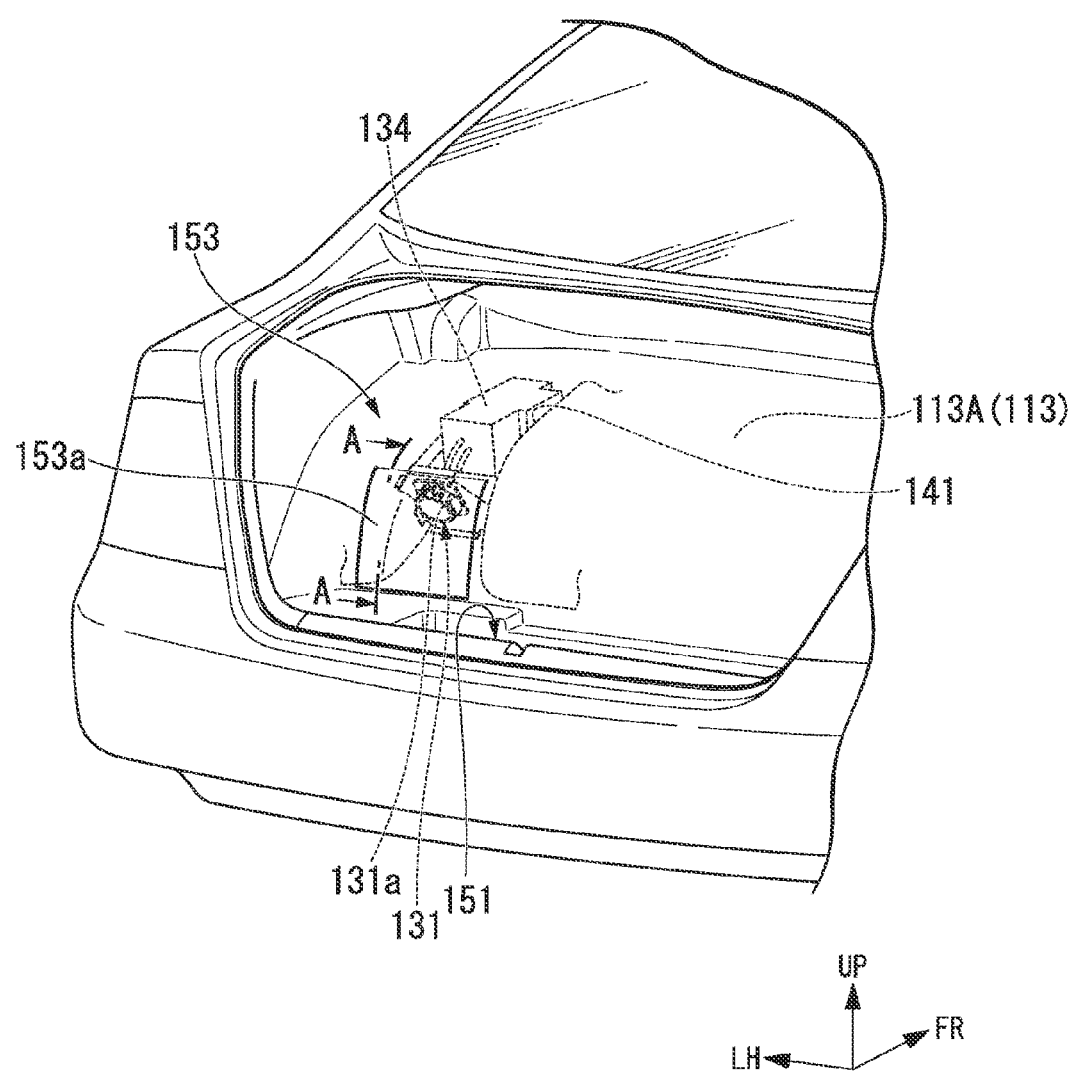
FIG. 11 is a perspective view illustrating the inside of the trunk room of the same electrically driven vehicle when viewed from the rear side of the vehicle body.

FIGS. 10 and 11 are perspective views illustrating the inside of the trunk room T/R when viewed from the rear side of the vehicle body. FIG. 10 shows a state of removing a trunk carpet 153 in the trunk room T/R, and FIG. 11 shows a state of laying the trunk carpet 153 in the trunk room T/R.

The trunk room T/R is formed in a bathtub shape at the rear side of the cabin C, and may load onto a bottom wall 151 of the trunk room. In addition, an inverter installation space 151*a* in which the inverter device 135 may be installed is provided at a center of the bottom wall 151 of the trunk room T/R in the vehicle width direction.

As shown in FIG. 9, the above-mentioned hydrogen tank 109 is disposed between a pair of rear wheel housings 152 covering the outsides of the left and right rear wheels Wr. The hydrogen tank 109 has a substantially cylindrical shape having a large diameter, and has an upper surface which is located upward more than a floor surface in the cabin C or an upper surface of the bottom wall 151 in the trunk room T/R in a state of being mounted to the vehicle body.

In the embodiment, the bottom wall 151 in the trunk room T/R is integrally formed with a rear floor panel 113 installed within the cabin C. However, the rear floor panel 113 is curved in an arc shape at the upper side of the vehicle body so as to straddle over the hydrogen tank 109 in a position where the hydrogen tank 109 is disposed. A portion which is curved upward of the rear floor panel 113 is lifted up toward the front side of the vehicle body from the bottom wall 151 of the trunk room T/R, thereby configuring a tank partition panel which partitions the hydrogen tank 109 from the vehicle interior side. Hereinafter, the curved portion is referred to as a partition panel portion 113A.

Although the embodiment has been described as an example where the tank partition panel is integrally formed with the rear floor panel 113, the tank partition panel may also be configured by a separate panel from the rear floor panel 113 or may be further formed by partially welding a separate panel to the rear floor panel 113.

A bent portion 140 is provided at an edge of one side (the left side in the proceeding direction of the vehicle) in the vehicle width direction in the partition panel portion 113A of the rear floor panel 113 so as to be further depressed with respect to a general outer surface form having an arc shape of the partition panel portion 113A. A recessed portion 141 is formed which is opened upward by the bent portion 140 and a side wall 152*a* of one rear wheel housing 152.

Figure 12:
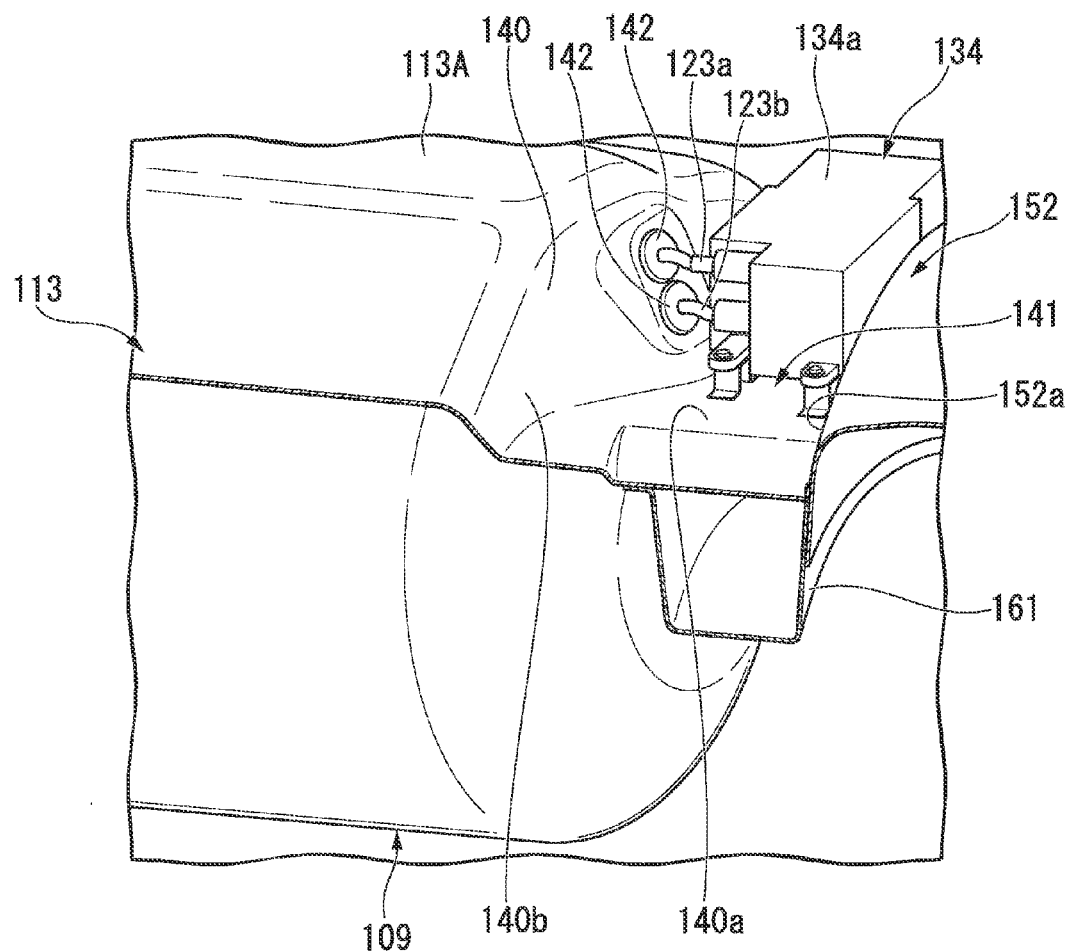
FIG. 12 is a perspective view of the same electrically driven vehicle indicated by arrow C when the electrically driven vehicle is broken at portion B of FIG. 8.

FIG. 12 is a perspective view of the fuel cell automobile 101 indicated by arrow C when broken at portion B of FIG. 8.

As shown in FIG. 12, a bottom wall 140*a* of the bent portion 140 configuring the recessed portion 141 is disposed at a portion right above one rear side frame 161 (at a position which overlaps with the associated rear side frame 161 in the upward and downward direction of the vehicle body), and is joined to the side wall 152*a* of the rear wheel housing 152 adjacent to the upper surface of the rear side frame 161. The recessed portion 141 formed in this way is regarded as a groove shape defined substantially along the forward and rearward direction of the vehicle body when viewed from the top (substantially along the rear side frame 161).

As shown in FIGS. 10 and 12, a region in which the groove-shaped recessed portion 141 is formed is a distorted region interposed between the side wall 152*a* of one rear wheel housing 152 and the spherical-shaped portion of the axial end portion of the hydrogen tank 109. Also, the region is a portion likely to be a dead space in which it is difficult to arrange the component and the like. In the fuel cell automobile 101, the groove-shaped recessed portion 141 is provided between the side wall 152*a* of one rear wheel housing 152 and the spherical-shaped portion of the axial end portion of the hydrogen tank 109, and thus the component may be arranged at an upper side of the recessed portion 141.

The power supply contactor 134 is disposed almost at the center within the recessed portion 141 in the forward and rearward direction of the vehicle body. In the power supply contactor 134, a contactor functional component is received in a casing 134*a* having a rectangular parallelepiped shape, and the casing 134*a* is fastened and fixed on the bottom of the recessed portion 141 (the bottom wall 140*a* of the bent portion 140) through a bracket and the like. The high-voltage cables 123*a* and 123*b* drawn from the casing 134*a* of the power supply contactor 134 pass through a side wall 140*b* of the partition panel portion 113A of the recessed portion 141 and are drawn downward of the rear floor panel 113. As shown in FIG. 8, the high-voltage cables 123*a* and 123*b* drawn downward of the rear floor panel 113 is guided along inside the left and right floor frames 163 in the vehicle width direction and is connected to the battery 111 or the fuel cell 102 through the junction box 119.

Grommets 142 are attached to penetration portions of the high-voltage cables 123*a* and 123*b* of the partition panel portion 113A, and thus the airtightness of the penetration portions is ensured. Accordingly, the power supply contactor 134 disposed on the recessed portion 141 is isolated while retaining an airtight state with respect to the hydrogen tank 109 disposed downward (at the outside of the vehicle) of the rear floor panel 113.

In addition, as shown in FIGS. 8 and 9, the power supply contactor 134 is disposed at a region which overlaps with the rear sub-frame 112 having a rectangular frame shape in the forward and rearward direction of the vehicle body, that is, at a region in a range of the front and rear width of the rear sub-frame 112 in the recessed portion 141.

Figure 13:
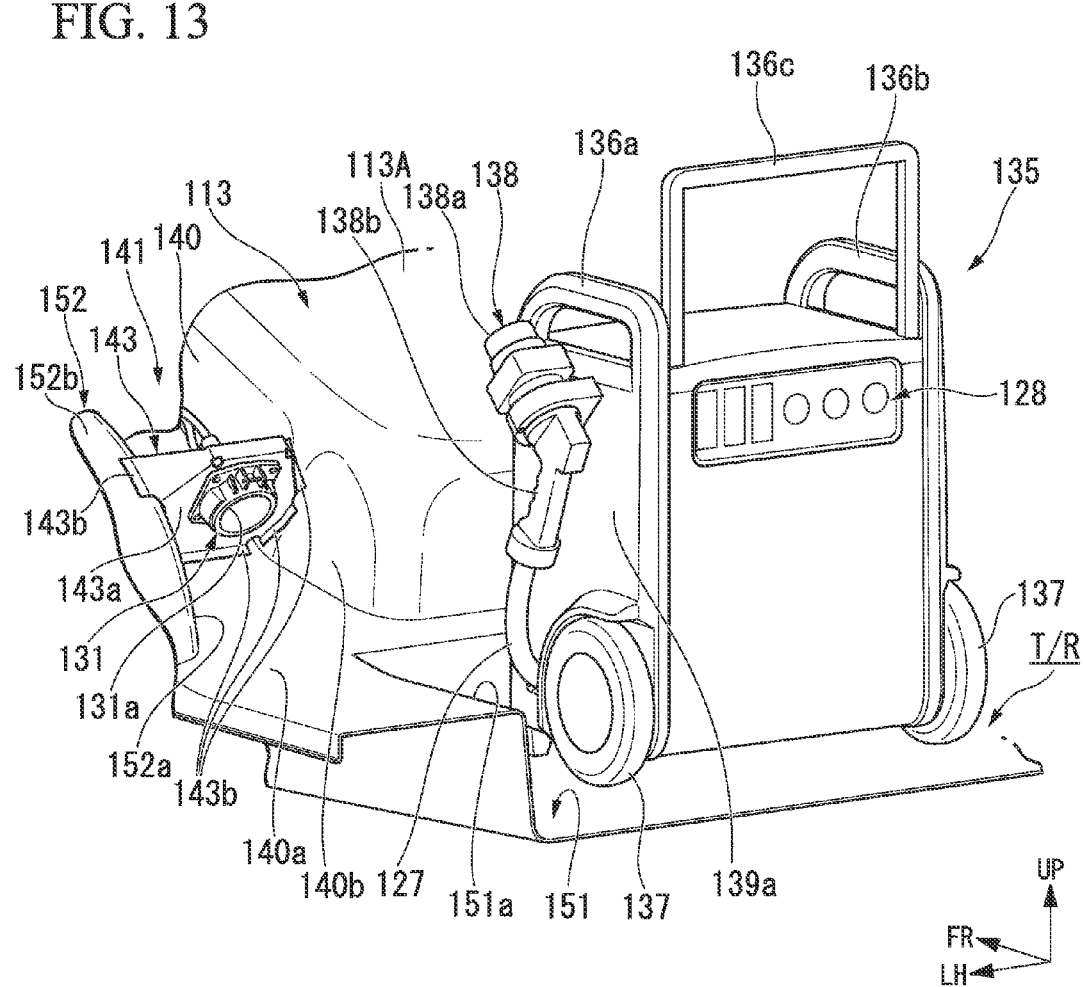
FIG. 13 is a perspective view illustrating a portion within the trunk room of the same electrically driven vehicle when viewed from the rear side of the vehicle body.

FIG. 13 is a perspective view illustrating the inside of the trunk room T/R when the inverter device 135 is disposed in the trunk room T/R.

As shown in FIGS. 10 and 13, the power supply connector 131 is attached through a bracket 143 made of metal at a position which is spaced apart by a predetermined distance from the power supply contactor 134 in the recessed portion 141 to the rear side of the vehicle body. The power supply connector 131 has a power supply port 131*a* to which a connector portion 138 of the inverter device 135 to be described later is fitted and connected. The power supply connector 131 is a so-called high-voltage connector which has a female type terminal made of metal such as copper inside a cylindrical-shaped housing made of an insulator such as resin. The power supply port 131*a* is provided with a fitting detection mechanism such as a microswitch (not shown), for example, and thus a fitting between the power supply port 131*a* and the connector portion 138 of the inverter device 135 may be detected.

As shown in FIG. 10, the power supply connector 131 and the power supply contactor 134 are connected by flexible connection cables (cables) 144*a* and 144*b*. The power supply contactor 134 allows the connection with the DC power source to be held in an OFF state when the connector portion 138 of the inverter device 135 in not inserted into the power supply port 131*a* of the power supply connector 131. On the other hand, the power supply contactor 134 allows the connection with the DC power source to be changed to an ON state when the fitting detection mechanism detects the connector portion 138 being connected to the power supply port 131*a*.

In the bracket 143, joining flange portions 143*b* are provided at both a lateral area and a lower area of a base wall 143*a* to which the power supply connector 131 is directly attached. These flange portions 143*b* are partially fixed to the bottom wall 140*a* and the side wall 140*b* of the bent portion 140 of the partition panel portion 113A and the side wall 152*a* and an upper wall 152*b* of one rear wheel housing 152 by welding and the like. That is, the bracket 143 is coupled to the left and right side walls 140*b* and 152*b* and the bottom wall 140*a* of the recessed portion 141.

In addition, when being laid in the trunk room T/R, the trunk carpet 153 shown in FIG. 11 almost completely covers the upper side and the rear side of the recessed portion 141 and conceals the power supply contactor 134, the power supply connector 131, or the like in the recessed portion 141 from the outside. An openable and closable lid portion 153*a* is provided at a position corresponding to the rear side of the recessed portion 141 of the trunk carpet 153 (at a position facing the power supply port 131*a* of the power supply connector 131). The power supply port 131*a* is generally closed by the lid portion 153*a*. When being connected to the connector portion 138 of the inverter device 135, the power supply port 131*a* is exposed to the outside by lifting up the lid portion 153*a*.

The inverter device 135 shown in FIG. 13 is entirely formed in a rectangular parallelepiped shape. The inverter device 135 is provided, at a plurality of positions of an upper portion thereof, with grasp portions 136*a*, 136*b* and 136*c* having a rectangular frame shape whiling being provided, at a lower portion thereof, with a pair of wheels 137. The pair of wheels 137 of the inverter device 135 is placed on the ground and the grasp portions 136*a*, 136*b* and 136*c* are grasped to be drawn by a worker, and thereby the inverter device 135 may be easily moved to any location.

The inverter device 135 is provided, at one side thereof, with a connection cable 127 which is formed by bundling a plurality of cables. The connector portion 138 is provided at a front end portion of the connection cable 127. The connector portion 138 includes a fitting portion 138*a* which may be fitted to the power supply connector 131 (the power supply port 131*a*) in the trunk room T/R, and a grip portion 138*b* which is formed at the connection cable 127 side more than the fitting portion 138*a*. The connector portion 138 may be attached and detached with respect to the power supply connector 131 in the trunk room T/R by a passenger grasping the grip portion 138*b* and guiding the connection cable 127.

In addition, an AC power output portion 128 to connect a connection plug of an AC device (not shown) is provided on a side surface which faces the rear of the vehicle body when the inverter device 135 is installed within the trunk room T/R.

As described above, in the fuel cell automobile 101 of the embodiment, since the power supply connector 131 to connect the inverter device 135 to the DC power source (the fuel cell 102 or the battery 111) of the vehicle is provided within the trunk room T/R, the fuel cell automobile 101 may supply the electric power to an external AC device at any location by loading the portable inverter device 135 into the trunk room T/R.

In the fuel cell automobile 101, the hydrogen tank 109 having a spherical shape at the end portion thereof is disposed between the left and right rear wheel housings 152, the hydrogen tank 109 is partitioned from the vehicle interior side by the partition panel portion 113A of the rear floor panel 113 which is lifted up toward the front side of the vehicle body from the bottom wall 151 of the trunk room T/R, the groove-shaped recessed portion 141 which is opened upward is provided between the lifting portion of the partition panel portion 113A and one rear wheel housing 152, and the power supply contactor 134 is disposed within the recessed portion 141. Therefore, the power supply contactor 134 may be disposed inside the vehicle interior (at the upper side of the rear floor panel 113) by effectively using the dead space which may be defined between the spherical-shaped end portion of the hydrogen tank 109 and the rear wheel housing 152.

Accordingly, in the fuel cell automobile 101, the power supply contactor 134 handling the high-tension power and the hydrogen tank 109 handling the high-pressure gas may be securely partitioned by the partition panel portion 113A of the rear floor panel 113, and it may be possible to prevent an issue in which the power supply contactor 134 presses the space in the trunk room T/R or the cabin C.

In the fuel cell automobile 101, the rectangular frame-shaped rear sub-frame 112 which surrounds the outside of the hydrogen tank 109 is fixed to the left and right rear side frames 161, and the power supply contactor 134 is disposed at a region which overlaps in the forward and rearward direction of the vehicle body with respect to the rear sub-frame 112 in the recessed portion 141. Therefore, the periphery of the hydrogen tank 109 may be protected by the rear sub-frame 112 having high stiffness, and the front and rear of the power supply contactor 134 may also be securely protected by the same rear sub-frame 112.

In the fuel cell automobile 101, the power supply connector 131 is disposed at a position spaced apart from the power supply contactor 134 to the rear side of the vehicle body and is connected to the power supply contactor 134 by the flexible connection cables 144a and 144b. Therefore, even when a large load is input to the power supply connector 131 portion from the rear side of the vehicle body, it may be possible to avoid the load facing in the direction of the power supply contactor 134 from the power supply connector 131 by the connection cables 144a and 144b.

Accordingly, in the fuel cell automobile 101, the power supply contactor 134 may be further securely protected with respect to an impact load input from rearward of the vehicle body.

Furthermore, in the fuel cell automobile 101, since the power supply connector 131 is coupled to the bottom wall 140a of the recessed portion 141 and the left and right side walls 152a and 140b through the bracket 143, the power supply connector 131 to which a large load is applied during the insertion or extraction of the connector portion 138 of the inverter device 135 may be supported at the vehicle body side with high stiffness.

In the fuel cell automobile 101 of the embodiment, the power supply contactor 134 is coupled to the portion right above one rear side frame 161 (at the position which overlaps with the associated rear side frame 161 in the upward and downward direction of the vehicle body) through the rear floor panel 113. Therefore, the support portion of the power supply contactor 134 may securely have enhanced stiffness by the rear side frames 161, and the power supply contactor 134 may be securely protected from the external force even by one rear side frame 161.

The above-mentioned embodiment has been described with respect to the fuel cell automobile 101 mounting the hydrogen tank 109. However, if the electrically driven vehicle mounts the gas tank, the fuel cell may not need to be necessarily used.

However, in the above-mentioned fuel cell automobile 101 which mounts the fuel cell 102 using the hydrogen gas as a fuel, since the power supply contactor 134 handling the high-tension power and the hydrogen tank 109 handling the hydrogen gas are securely partitioned from the outside of the vehicle interior by the partition panel portion 113A, the hydrogen gas may be securely prevented from infiltrating into the vehicle interior side.

Meanwhile, the present invention is not limited only to the above embodiments, and various modifications and variations can be made based on the design requirement and the like without departing from the spirit or scope of the present invention.

Although the above embodiments have been exemplarily described with respect to the fuel cell automobile driven using the fuel cell as a power source as an example of the electrically driven vehicle to which the present invention is applied, the present invention is not limited thereto. For example, the present invention may also be widely applied to a vehicle mounting a DC power source such as an electric vehicle driven using a battery as a power source, or a so-called hybrid vehicle driven using a battery and an internal combustion engine as a power source.

In addition, although the inverter device of the above embodiments includes the grasp portions having a rectangular frame shape at the upper portion thereof and the pair of wheels at the lower portion thereof, the shape of the inverter device is not limited thereto.

In addition, in the above embodiments, although the fitting detection mechanism such as a microswitch is provided at the power supply port, the fitting detection mechanism is not limited to the microswitch. For example, terminals are respectively provided at the power supply port in the trunk room and the connector portion of the inverter device and a fitting detection connector is formed, and thus the fitting between the power supply port in the trunk room and the connector portion of the inverter device may also be electrically detected.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle power supply system which converts electric power into AC (Alternating Current) power from a DC (Direct Current) power source mounted in an electrically driven vehicle and supplies the AC power to an external AC device of the electrically driven vehicle, the vehicle power supply system comprising:
a trunk room which is provided in the electrically driven vehicle;
a power supply connector having a power supply port which is provided within the trunk room and electrically connected to the DC power source; and
an inverter device which is provided separately from the electrically driven vehicle, is disposed within the trunk room to convert the electric power into the AC power from the DC power source and supplies the AC power to the external AC device connected to the inverter device,
wherein the trunk room is provided therein with an inverter installation space where the inverter device is installed at a position which does not overlap with the power supply port when viewed from a forward and rearward direction of the electrically driven vehicle, and
wherein the inverter device is provided with a connection cable which is drawn from a side surface thereof and of which a front end portion has a connector portion connected to the power supply port.

2. The vehicle power supply system according to claim 1,
wherein the power supply port is formed rearward and downward of the electrically driven vehicle, and
wherein when the inverter device is installed in the inverter installation space within the trunk room, the connection cable extends upward from below of a side surface on which the power supply port is disposed among side surfaces of the inverter device.

3. The vehicle power supply system according to claim 1, further comprising:
a pair of rear wheel housings which covers the outsides of left and right rear wheels;
a gas tank which is disposed between the pair of rear wheel housings, supported by vehicle body frames outside the lower side of a vehicle interior, and disposed at a front side of a vehicle body of the trunk room;
a tank partition panel which is lifted upward toward the front side of the vehicle body from a bottom wall of the trunk room and partitions the gas tank from the vehicle interior side; and
a contactor which performs connection or cut-off of the electric power between the DC power source and the power supply connector,
wherein a recessed portion which is opened upward is provided between the lifting portion of the tank partition panel and one of the pair of rear wheel housings, and the contactor is disposed within the recessed portion.

4. The vehicle power supply system according to claim 3,
wherein the gas tank is attached to the vehicle body frames through a rectangular frame-shaped sub-frame which surrounds the outside of the gas tank, and
wherein the contactor is provided at a region which overlaps in a forward and rearward direction of the vehicle body with respect to the sub-frame attached to the vehicle body frames.

5. The vehicle power supply system according to claim 3,
wherein the power supply connector is connected to the contactor by a flexible cable, and is disposed at a position which is spaced apart from the contactor in the trunk room to the rear side of the vehicle body.

6. The vehicle power supply system according to claim 3,
wherein a bracket, which is coupled to left and right side walls and a bottom wall of the recessed portion, is provided at the rear side of the vehicle body of the contactor in the recessed portion, and
wherein the power supply connector is fixed within the recessed portion through the bracket.

7. The vehicle power supply system according to claim 3,
wherein the contactor is provided at a position which overlaps with a side frame, in an upward and downward direction of the vehicle body, extending in the forward and rearward direction of the vehicle body among the vehicle body frames.

8. The vehicle power supply system according to claim 3,
wherein the electrically driven vehicle is a fuel cell vehicle that includes a hydrogen tank as the gas tank and a fuel cell which generates electric power using a hydrogen gas filled in the hydrogen tank as a fuel and that drives using the generated electric power by the fuel cell.

* * * * *